United States Patent Office 3,557,615
Patented Jan. 26, 1971

3,557,615
APPARATUS FOR DETECTING FLAWS IN AN ELONGATED MOVING STRAND
James O. Seymour, Jr., Murrysville, Pa., and Hendrick B. F. Agterhuis, Eindhoven, Netherlands, assignors to Westinghouse Electric Corporation, Pittsburgh, Pa., a corporation of Pennsylvania
Filed May 27, 1969, Ser. No. 828,196
Int. Cl. G01l 5/00; B65h 25/00
U.S. Cl. 73—160  10 Claims

ABSTRACT OF THE DISCLOSURE

Apparatus for detecting flaws in an elogated moving strand comprising a plurality of pairs of oppositely disposed rollers through which the strand moves. A first roller of each pair has attached thereto and movable therewith a coil and a second roller of each pair has attached thereto and movable therewith a permanent magnet core. The permanent magnet core of the second roller is positioned inside the coil of the first roller. When a flaw in the strand is detected by either of the rollers the permanent magnet core moves relative to the coil and a voltage is induced in the coil. An electrical tachometer measures the speed of movement of the strand. The output from the tachometer is a voltage output. The voltage output from the coils associated with each pair of rollers is compared with the voltage output from the tachometer in operational amplifier means. If the voltage output from a coil is greater than the voltage output from the tachometer a signal from the operational amplifier means operates a flip-flop circuit which in turn opens a circuit breaker which shuts down the machine which is moving the strand. After the flaw in the strand is corrected, a signal is injected into the flip-flop to restart normal operation and the circuit breaker is closed and the machine again starts the strand moving through the pairs of rollers.

BACKGROUND OF THE INVENTION

Field of the invention

This invention relates to apparatus for detecting flaws on the entire surface of an elongated moving strand, and more particularly for detecting burrs and slivers on strand conductors, such as copper or aluminum, which is to be used for electrical windings.

Description of the prior art

It is necessary to detect burrs and slivers on conductors used for electrical windings, because if not removed burrs and slivers will puncture the insulation on the strand and short turns of the winding; thereby, making the winding useless.

In the prior art there is a device for detecting burrs and slivers on all surfaces of a moving strand. This device has a plurality of opposing detecting members between which the moving strand is drawn by an associated taping of reeling machine. These detecting members are resiliently biased toward each other to provide firm contact with the surface of the moving strand. Associated with one of the detecting members of each opposing group of detecting members is a circuit controller or microswitch that is responsive to movement of opposing detecting members away from each other. This circuit controller shuts down the associated taping or reeling machine when a flaw is detected. This device relies upon inertia associated with the detecting members to operate the circuit controller and it is sensitive to adjustment and must be very carefully adjusted for each wire size to be monitored. The device can also only be adjusted for one strand speed. This device is described in United States Pat. 2,929,245.

The device provided by this invention overcomes the objections to the prior art device by providing a flaw detector which will detect burrs and slivers, or other flaws, on any size or configuration or strand, at different speeds, without requiring calibration for each size or configuration or speed of movement of the strand. Upon detection of a flaw the taping or reeling machine associated with the flaw detector is shut down by opening the circuit providing power to the associated taping or reeling machine.

SUMMARY OF THE INVENTION

This invention provides an improved apparatus for inspecting a moving strand and detecting flaws such as burrs, slivers, or other flaws in the strand. The apparatus comprises a plurality of opositely disposed sets of rollers between which the strand to be inspected is drawn. The strand is usually drawn through the rollers by a taping or reeling machine drive motor.

Each roller of a set of rollers is mounted to be movable in substantialy a straight line with respect to each other roller in a set when a flaw is detected. Each roller in each set of rollers inspects at least one surface of the strand.

A coil is associated with one roller of each set of rollers and the coil is movable with its associated roller. A permanent magnet core is associated with the other roller of each set of rollers. The permanent magnet core of each set of rollers is positioned inside the coil associated with that set of rollers. The permanent magnet core moves with respect to the coil when either of the rollers of a set of rollers passes over a flaw on the moving strand. This movement of the core with respect to the coil generates a voltage in the coil proportional to their relative velocity. A tachometer having an electrical output is provided to measure the speed of movement of the strand. The voltage output from each of the coils associated with each pair of rollers is compared with the output of the tachometer in operational amplifier means and the output from operational amplifier means is applied to the input of a two mode flip-flop means and the output from the two mode flip-flop means operates a circuit breaker to shut down the machine which is moving the strand between the rollers. The flip-flop operates in mode one with no output when there is no flaw being detected. When a flaw is detected, the output from a coil associated with a set of rollers is larger than the output from the tachometer and this output triggers the flip-flop to mode two operation. In this mode, the flip-flop has an output of one, which output operates a circuit breaker to shutdown the machine moving the strand. After the machine has been shutdown by a flaw, and the flaw has been removed, the flip-flop is then reconditioned or reset for the first or mode one operation by inserting a voltage into the flip-flop. The apparatus provided by this invention will inspect strands of different sizes and configurations at different speeds without recalibration.

The parts of the apparatus provided by this invention comprising the tachometer, the sets of rollers with their associated cores and coils, the amplifier means, the flip-flop means, and the circuit breaker or control means may all be mounted on a common chassis for installation as a unit on a taping or reeling machine, or the individual parts may be installed individually at convenient locations on an existing taping or reeling machine.

DESCRIPTION OF THE PREFERRED EMBODIMENT

Figure 2:
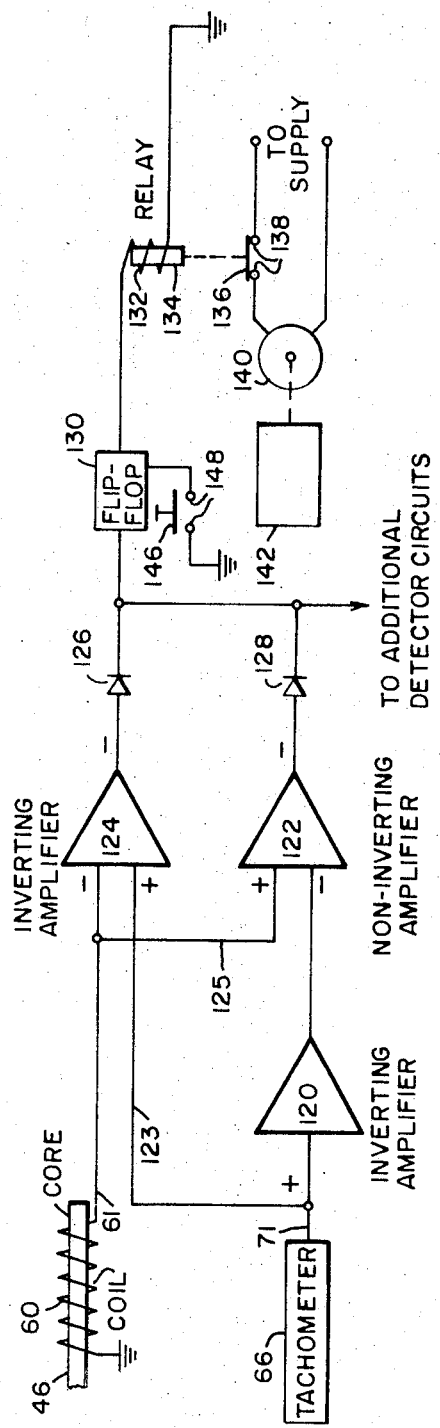
FIG. 2 is a simplified schematic diagram of the control circuit associated with any one pair of the detecting rollers illustrated in FIG. 1.

Throughout the description which follows, like reference characters refer to like parts on the various figures of the drawing.

Figure 1:
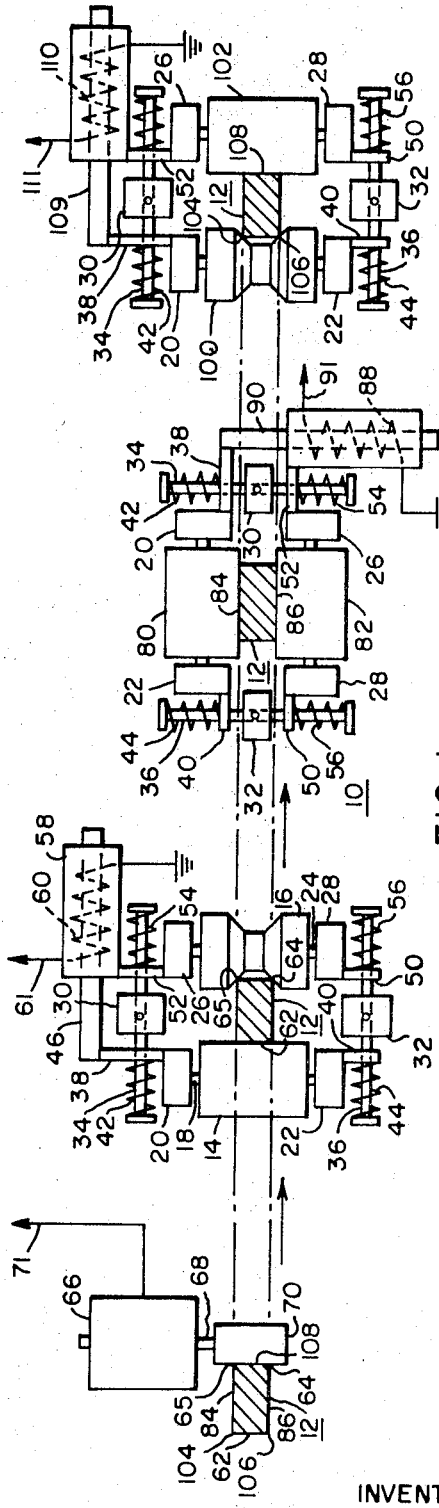
FIG. 1 is a partial schematic diagram of detecting apparatus provided by this invention.

Referring specifically to the drawing, FIG. 1 is a partial schematic of an inspection or flaw detecting apparatus 10 as provided by this invention.

The apparatus 10 comprises three sets or pairs of oppositely disposed rollers which are contoured to inspect all surfaces of a moving strand 12 as the strand 12 is drawn between the oppositely disposed pairs or sets of rollers by a taping, or reeling, or other power driven machine. The strand 12 is illustrated as being rectangular in cross section; however, it is understood that the strand 12 may have any desired cross-section configuration. The first pair or set of rollers comprise rollers 14 and 16. The roller 14 is mounted on a spindle 18. The spindle 18 is supported in a pair of bearing members 20 and 22. The roller 16 is mounted on a spindle 24. The spindle 24 is supported in a pair of bearing members 26 and 28.

Support members 30 and 32 are provided for supporting the pair of rollers 14 and 16. The support member 30 carries a rod member 34 and the support member 32 carries a rod member 36 which is substantially parallel to the rod member 34.

The bearing 20 carries a bracket 38 and the bearing 22 carries a bracket 40. The brackets 38 and 40 have holes therein through which the rod members 34 and 36 extend. The brackets 38 and 40 are spring biased on the rod members 34 and 36 by coil springs 42 and 44 which surround the rod members 34 and 36. The bracket 38 has attached thereto a permanent magnet core member 46.

The bearing 28 carries a bracket member 50 and the bearing member 26 carries a bracket member 52. The brackets 50 and 52 have holes therein through which the rod members 34 and 36 extend. The brackets 50 and 52 are spring biased on the rod members 34 and 36 by coil springs 54 and 56 which surround the rod members 34 and 36. The bracket 52 has attached thereto a coil support 58, which coil support 58 carries an electrical coil 60. The permanent magnet core 46 is located inside the coil 60 and when either the roller 14 or 16 moves relative to each other the permanent magnet 46 moves relative to the coil 60. This relative movement of the permanent magnet core 46 and coil 60 generates a voltage in the coil 60.

The roller 14 has a flat surface which rolls against the flat side 62 of the strand. The roller 16 has a frustoconical surface which rolls against the corners 64 and 65 of the strand 12. As the strand 12 moves between the rollers 16 and 14, if a flaw is detected on the side 16 of the strand 12 the roller 14 will move relative to the roller 16 and the magnet 46 will move in the coil 60 and generate a voltage in the coil. If the roller 16 detects a flaw on either of the corners 64 or 65 the roller 16 will move relative to the roller 16 and the coil 60 will move relative to the magnet 46 and generate a voltage in the coil 60. It is seen that the movement of the rollers 14 and 16 relative to each other and therefore the movement of the core 46 relative to the coil 60 is substantially a straight line horizontal movement. The voltage output 61 from the coil 60 will be positive going when either of the rollers 14 or 16 detects the leading edge of a flaw on the strand 12 and negative going when the trailing edge of a flaw is indicated on the strand 12.

An electrical tachometer 66 having a shaft 68, which shaft 68 carries a rotor 70 is provided for measuring the speed of movement of the strand 12. The tachometer 66 is mounted in some convenient place so that the rotor 70 always contacts the strand 12 or is mechanically linked to the machine drive. The tachometer 66 has an output voltage as indicated at 71. The tachometer may be of a commercially available type.

A second set or pair of oppositely disposed rollers 80 and 82 are provided for inspecting the opposite sides 84 and 86 of the strand 12. The pair of rollers 80 and 82 are mounted for movement relative to each other in substantially the same manner as the first pair or set of rollers 14 and 16. The roller 82 carries a coil 88 and the roller 80 carries a permanent magnet core 90 which moves inside the coil 88 when a flaw or defect is detected in the strand 12 by either of the rollers 80 or 82. Movement of the core 90 relative to the coil 88 produces a voltage output from the coil which is indicated by the reference character 91. The coil 88 and the permanent magnet 90 are substantially identical to the permanent magnet 46 and the coil 60 associated with the first pair or set of rollers 14 and 16.

A third pair or set of rollers 100 and 102 are provided. This third set of rollers are identical to the first set or pair of rollers 14 and 16 but oppositely disposed. The roller 100 has a frustoconical surface for inspecting the corners 104 and 106 of the strand 12 and the roller 102 has a flat surface for inspecting the flat surface 108 of the strand 12 for flaws. The roller 102 has associated therewith a coil 110 and roller 100 has associated therewith a permanent magnet 109 which moves inside the coil 110 relative to the coil 110 when a flaw is detected by either of the rollers 100 or 102 to produce a voltage output from the coil which output is indicated at 111. The magnet 109 and the coil 110 are identical to the magnet 46 and the coil 60 associated with the first set of rollers 14 and 16.

It is seen from the herinbefore description of the apparatus of FIG. 1 that this invention provides means for inspecting the entire surface area of a moving strand 12 and producing a voltage output for any flaw detected. The voltage output having a positive going sign for the leading edge of a flaw and a negative going sign for the trailing edge of a flaw as the strand 12 is moved through the apparatus in the direction of the arrows shown in FIG. 1. This invention also provides means for measuring the speed of movement of the strand 12 through the apparatus for detecting flaws in the strand 12 and produce a positive going voltage output proportional to the speed of movement of the strand 12.

FIG. 2 illustrates schematically the control circuitry for utilizing the voltage output from the tachometer 66 and the voltage output from one of the coils associated with one of the pairs or sets of rollers for controlling a circuit controller for stopping the machine that is moving the strand 12 between the pairs of sets of rollers. In FIG. 2, assume, for the purpose of explanation, that 46 is the core asociated with roller 14 and 60 is the coil associated with roller 16.

The output from the tachometer 66 is positive going. This output is connected by means of the conductor 71 to the input of inverting amplifier means 120. The output from the amplifier means 120 is negative going. This negative going voltage is connected to one input of non-inverting operational amplifier means 122. The positive going voltage from the tachometer 66 is also connected by means of a conductor 123 to one input of inverting operational amplifier means 124. The voltage output from the coil 60 is connected by means of conductor 61 to a second input of the inverting amplifier means 124. The output from the coil 60 is also connected by means of a conductor 125 to a second input of the non-inverting amplifier means 122. The outputs from the operational amplifier means 122 and 124 are connected to diodes 126 and 128, respectively. The outputs from the diodes 126 and 128 are connected to the input of a two mode flip-flop means 130. The flip-flop means 130 has two modes of operation. In mode one operation the flip-flop means 130 has zero output. In mode two operation the flip-flop means 130 has an output of one. The output from the flip-flop means 130 is connected to the coil 132 of a stick type relay. The coil 132 of the relay has a core 134 therein which moves when the coil 132 is energized to move a bridging member 136, which bridging member 136 is attached to the core 134 and moves with the core 134. The bridging member 136 serves to open and close a pair of circuit contacts 138. The contacts 138 control the power for operating a motor 140. The motor 140 drives a taping, reeling and every other machine for moving the strand 12 between the rollers 14 and 16.

In the operation of the control circuit of FIG. 2, the voltage output from the tachometer 66 is set to be normally greater than the voltage output from the coil 60 when no flaw, such as a burr or sliver is present on the strand 12. Under these conditions the outputs from the operational amplifier means 122 and 124 would be negative going. These negative going outputs would be blocked by the diodes 126 and 128 and there would be no input to the flip-flop means 130 and the bridging member 136 of the relay would maintain the contacts 138 closed and the machine 142 would move the strand 12 along at a set speed between the rollers 14 and 16. However, should a flaw be detected by either of the rollers 14 or 16 the voltage output of the coil 60 would be greater than the bias voltage of the tachometer 66. If the flaw is detected on its leading edge, a positive going signal is applied to the non-inverting amplifier means 122. This signal being greater than the negative going bias of the tachometer 66, the amplifier means 122 will deliver a positive going signal to the rectifier 128. This signal will be passed by the rectifier 128 and applied to the input of the flip-flop means 130. This input signal will change the mode of operation of the flip-flop means 130 from mode one with no output to mode two with an output. The output from the flip-flop means 130 will energize the coil 132 of the relay. This will cause core 134 of the relay to raise the bridging member 136 and open the circuit to the motor 140. This causes the machine 142 to shut down. After the flaw has been removed from the strand 12 the apparatus is conditioned for restarting the machine 142 by pushing a button 146 to close contacts 148 and inject a voltage into the flip-flop means 130 for mode one operation. The motor 140 for operating the machine 142 may then be restarted to move the strand 12 by closing the necessary circuit breakers.

If a flaw is detected on its trailing edge, a negative going signal is applied to the inverting amplifier means 124. This signal being greater than the positive going bias signal from the tachometer 66, the amplifier means 124 will deliver a positive going output to the rectifier 126. This signal will be passed by the rectifier 126 and applied to the input of the flip-flop means 130. This input signal will shift the mode of operation of the flip-flop means 130 from mode one with no output to mode two with an output. The output from the flip-flop means 130 will energize the coil 132 of the relay. This will cause the core 134 of the relay to raise the bridging member 136 and open the circuit to the motor 140. This causes the machine 142 to shutdown. After the flaw has been removed from the strand 12, the apparatus may be conditioned for restarting the machine 142 by pushing a button 146 to close contacts 148 and inject a voltage into the flip-flop means 130 for mode one operation. The motor 140 for operating the machine 142 may then be restarted to move the strand 12 by closing the necessary circuit breaker.

Figure 3:
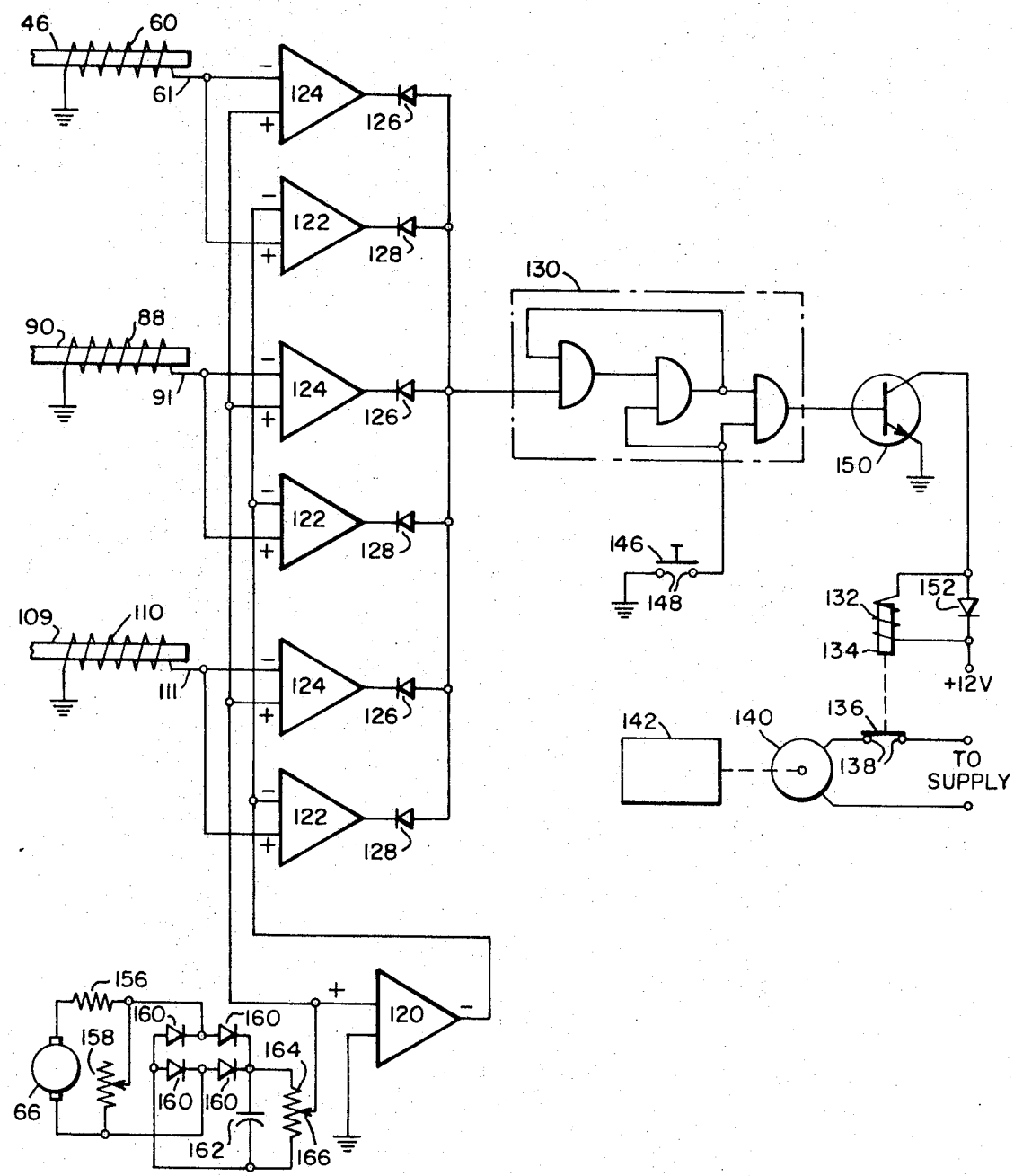
FIG. 3 is a complete schematic diagram of the control circuitry associated with the apparatus illustrated in FIG. 1.

Referring specifically to FIG. 3, this figure is a schematic showing how the voltage output from each of the coils 60, 88 and 110 assocated with the three set of rollers 14, 16; 80, 82; and, 100, 102 are compared with the voltage output from the tachometer 66 to stop the movement of the strand 12 when either of the rollers detect a flaw or defect in the moving strand. As shown in FIG. 3 each of the coils 60, 88 and 110 has its output connected to an inverting operational amplifier 124 and to a non-inverting operational amplifier 122. As explained with reference to FIG. 2 each of these amplifiers 124 and 122 are biased by the output from the tachometer 66. Whenever either of the rolls of the three sets of rolls described hereinbefore detects a flaw and the output from the coil associated with this particular set of rollers is greater than the bias voltage from the tachometer 66 there is a positive output from one of the operational amplifiers and this positive output is passed by the rectifiers 126 and 128 connected to the output of the operational amplifiers 122 and 124 and this output functions to change the mode of operation of the flip-flop circuit 130. As in FIG. 2, the flip-flop circuit 130 is a two mode flip-flop which when operating in mode one has no output but when a signal is applied to its input it shifts to mode two and has an output of one. In FIG. 1 the output from the flip-flop 130 is applied to a transistor amplifier 150. The amplifier 150 amplifies the output from the flip-flop 130 and this amplified output is applied to the coil 132 of a relay to move a solenoid 134 which carries a bridging member 136 which opens and closes a pair of contacts 138 which controls the power applied to a motor 140 which operates a machine 142 which machine 142 is moving a strand 12 between three sets of rollers. A rectifier 152 and a voltage source is upplied to provide power to the coil 132 to move the core 134 when the transistor amplifier 150 becomes conductive due to the output from the flip-flop 130. As in FIG. 1, when a flaw is detected by either of the rollers a signal will be applied to the flip-flop circuit which will change the mode of operation of the flip-flop circuit which will shutdown the machine 142. When the machine shuts down the operator will normally remove the fault from the strand 12 and then recondition the flip-flop 130 for mode one operation by pushing a button 146 to close a pair of contacts 148 to inject a voltage into the flip-flop circuit for conditioning the flip-flop circuit for mode one operation. After the flip-flop circuit 130 has been reconditioned for mode one operation the machine 142 may again be started by closing the necessary circuit breakers and the strand 12 will again be moved between the pairs of rollers.

In FIG. 3 the resistors 156 and 158 shown in the tachometer circuit are used to coarse adjust the output of the tachometer to the rectifier bridge 160. The output from the tachometer 66 is applied to a four-legged rectifier bridge comprising four rectifiers 160. A condenser 162 is provided across the bridge comprising the four rectifiers 160 to filter the rectified direct current. A resistor 164 is connected across two legs of the bridge comprising the four rectifiers 160. A movable tap 166 is provided on the resistor 164 for adjusting the bias voltage which is applied to the operational amplifier means 122 and 124. This has the effect of adjusting the size burr sensed. The inverting operational amplifier 120 shown in FIG. 3 operates in the same manner as the amplifier shown in FIG. 2.

All of the operational amplifiers 120, 122, 124 are of a conventional type which may be purchased on the market. One available type is known as Fairchild 45B770939. All of the diodes shown in the drawings are conventional types of semi-conductor diodes which may be purchased on the market.

The flip-flop device indicated on both FIGS. 2 and 3 is a standard commercial device and as shown in FIG. 3 comprises three AND logic elements formed on a single semiconductor chip. A conventional flip-flop device which may be used is designated as WC246D and is sold by the Westinghouse Electric Corporation.

From the foregoing description it is seen that this device has provided a flaw detector for moving strands which is dependent upon the diameter of the rollers, which is a constant, the size of the flaw, which may be a burr or a sliver, and the speed at which the moving strand is being moved between the rollers. To give an indication when a flaw is present a voltage proportional to the velocity of the movement of either the coil or the permanent magnet associated with a pair of rollers is summed or compared with the voltage from the tachometer and the flip-flop circuit is set such that whenever the signals generated in the coil by the movement of the core is greater than the tachometer signal, the flip-flop circuit changes its mode of operation to indicate the presence of a flaw.

This apparatus provides a flaw detector which accurately indicates when a flaw is present in a strand which is being rapidly moved through the sets of rollers. Some of the advantages of the apparatus provided by this invention over that provided by the prior art are that the apparatus does not require frequent calibration checks, neither does it require adjustment of calibration when the strand size is changed, and it is adaptable to inspect strands of many cross-sectional configurations.

We claim:

1. Apparatus for detecting flaws in an elongated moving strand comprising, at least one pair of first and second opposing rollers between which said strand moves, means mounting said rollers so that they are movable relatively to each other, a coil attached to move with a first one of said rollers, a permanent magnet core attached to move with a second one of said rollers, said permament magnet core being located inside said coil and movable relatively to said coil upon movement of either said first or said second roller to produce a voltage output from said coil, means for measuring the speed of movement of said strand, said speed measuring means having a voltage output, amplifier means in which the voltage output of said coil is compared with the voltage output of said speed measuring means, means responsive to the output of said amplifier means to operate circuit controller means to control the movement of said strand.

2. The apparatus of claim 1 wherein said pair of first and second rollers are mounted to move in substantially a straight line relative to each other.

3. The apparatus of claim 1 wherein said means for measuring the speed of movement of said strand comprises an electrical tachometer having a rotor contacting the movable strand.

4. The apparatus of claim 1 wherein said amplifier means comprise at least one operational amplifier.

5. The apparatus of claim 1 wherein said amplifier means comprises two operational amplifiers, each of said amplifiers being connected to the output from said speed measuring means and to the output from said coil.

6. The apparatus of claim 1 wherein said means responsive to the output of said amplifier means comprises flip-flop means.

7. The apparatus of claim 1 wherein said means responsive to the output of said amplifier means comprises a flip-flop means, said flip-flop means delivering an output when the voltage output from said coil exceeds the voltage from said speed measuring means.

8. The apparatus of claim 6 wherein the output from said flip-flop means operates a circuit breaker which controls the movement of said strand.

9. Apparatus for detecting flaws in an elongated moving strand comprising, a plurality of pairs of first and second opposing rollers between which said strand moves, means mounting said rollers so that each roller of each pair of rollers is movable with respect to each other roller of each pair of rollers, a coil attached to move with a first roller of each pair of rollers, a permanent magnet core attached to move with a second roller of each pair of rollers, said permanent magnet cores being located inside said coils and movable relative to said coils upon movement of either said first or said second roller of a pair of rollers, means for measuring the speed of movement of said strand, said speed measuring means having a voltage output, amplifier means in which the voltage output from each of said coils is compared to the voltage output of said speed measuring means, and flip-flop means responsive to the output from said amplifier means to operate circuit controller means to control the movement of said strand.

10. The apparatus of claim 9 wherein separate amplifier means are provided for comparing the output of each coil with the output from the speed measuring means, and means connecting the outputs from all of the separate amplifier means to the flip-flop means.

References Cited

UNITED STATES PATENTS

| | | | |
|---|---|---|---|
| 2,929,245 | 3/1960 | Fischer | 73—160 |
| 3,100,889 | 8/1963 | Cannon | 340—265 |

JAMES J. GILL, Primary Examiner

M. SMOLLAR, Assistant Examiner

U.S. Cl.X.R.

28—64; 73—105; 200—61.13; 340—197, 259, 265